000
United States Patent Office 3,012,015
Patented Dec. 5, 1961

3,012,015
COPOLYMERS OF ACRYLONITRILE AND SULFO-PROPIONYL SUBSTITUTED AMIDES
Olof Sunden, Lidingo, and Stig Bertil Stenemur, Ljungaverk, Sweden, assignors to Stockholms Superfosfat Fabriks Aktiebolag, Stockholm, Sweden, a company of Sweden
No Drawing. Filed Mar. 16, 1959, Ser. No. 799,482
10 Claims. (Cl. 260—79.3)

INTRODUCTION

This invention generally relates to new copolymers of acrylonitrile and an unsaturated compound containing a sulfonic acid radical attached to an amide configuration. This invention also pertains to fibers and filaments prepared from such copolymers.

BACKGROUND

It is well known that valuable fibers can be formed from acrylonitrile. However, it is also well known that acrylic fibers have certain drawbacks such as lack of pure whiteness, lack of dimensional stability (shrinking) and lack of sufficient dye-receptivity. Attempts have been made to overcome the insufficient dye-receptivity properties of acrylonitrile polymers by copolymerizing with other materials having basic or acidic properties. Materials such as methylacrylate, methyl methacrylate, acrylamide, vinyl acetate and styrene have been used for this purpose in forming copolymers with acrylonitrile. However, for the most part fibers produced from such copolymers usually exhibit inferior whiteness, inferior thermal stability, and inferior dimensional stability compared with fibers of homo-acrylonitrile polymers.

OBJECTS

It is therefore, a primary object of this invention to produce acrylonitrile copolymers and fibers thereof which have increased dimensional stability. Another object of this invention is to produce copolymers and fibers thereof which have an improved whiteness and an improved thermal stability which in turn means less heat-discoloration. A further object of this invention is to produce copolymers and fibers thereof with a decreased tendency toward static build-up (charging) and with decreased fat and dirt absorption properties. A still further important object of the invention is to produce copolymers and fibers with strongly increased receptivity for basic dyes. Other objects and advantages of this invention will become more apparent after studying the following description and examples.

THE INVENTION BROADLY

The present invention broadly involves the production of novel copolymers comprising at least about 85% by weight of acrylonitrile and up to about 15% by weight of certain copolymerizable alkyl sulfonates (or a derivative or a water soluble salt of such sulfonates). The said alkyl sulfonates should contain at least one acrylamide radical and at least one sulfopropionamide radical joined together by at least one methylene bridge.

THE COPOLYMERIZABLE ALKYL SULFONATE

The alkyl sulfonates suitable for producing the copolymers in accordance with this invention have the following formula:

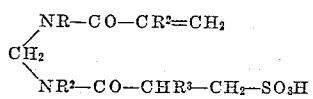

wherein:
$R_1$ and $R_2$ either represent hydrogen atoms or the bridge R—$R^1$ represents the dimethylamine residue of a hexahydrotriazine ring, and
$R^2$ an $R^3$ represent hydrogen atoms or lower alkyl radicals (e.g. methyl groups).

Examples of alkyl sulfonates of the kind described are: N-acryloyl-N'-sulfopropionyl-methylenediamine, hexahydro-1,3-diacryloyl-5-sulfopropionyl-s-triazine, hexahydro-1-acryloyl-3,5-disulfopropionyl-s-triazine, and hexahydro-1-acryloyl-3-sulfopropionyl - 5 - aminopropionyl-s-triazine.

Other compounds falling within the above general formula are corresponding compounds based upon methacrylic acid or compounds containing a radical with an active hydrogen atom instead of the amine radical, e.g. a hydroxyl group, or an alkyl ether radical.

Of the sulfonates listed above, hexahydro-1,3-diacryloyl-5-sulfopropionyl-s-triazine possesses two double bonds and accordingly will act as a cross-linking agent. In order to obtain a copolymer soluble in the commonly used polymer solvents (i.e. dimethylformamide, dimethylacetamide, dimethylsulfoxide, ethylene carbonate and propylene carbonate) the amount of said sulfonate which is present during the polymerization should be rather small, i.e. 0.05–0.3 percent by weight of acrylonitrile (up to about 0.1 molar percent). Copolymers containing this sulfonate possess an improved whiteness and thermal stability but only a slight dye-receptivity if no other comonomer is present in the copolymer.

The compounds N-acryloyl-N'-sulfopropionyl-methylenediamine and hexahydro - 1 - acryloyl-3,5-disulfopropionyl-s-triazine can be used in higher amounts in the copolymer (e.g. up to 15% by weight) to obtain a strongly increased dye-receptivity, whiteness and thermal stability. When using only 0.5–3% by weight of these sulfonates in the copolymer a quite sufficient whiteness, thermal stability and dimensional stability are obtained. However, in order to achieve a really excellent dye-receptivity, a higher amount of these sulfonates has to be used, and preferably 2–6% by weight. When using hexahydro-1-acryloyl-3,5-disulfopropionyl-s-triazine in amounts above about 5% by weight the dye-receptivity increases rapidly due to the polymer becoming less crystalline and accordingly more easily penetrable for dyes.

Hexahydro-1-acryloyl-3-sulfopropionyl - 5 - aminopropionyl-s-triazine may also be used in a greater amount 2–6% by weight, giving excellent dyeability. Since this sulfonate is amphoteric, the repelling effect of polyacrylonitrile upon a monomer containing acidic groups is reduced and a more complete copolymerization is obtained. On the other hand, however, the improvement in whiteness and thermal stability resulting from the use of this sulfonate is not as great as when using the previously mentioned sulfonates.

PREPARATION OF THE ALKYL SULFONATES

The alkyl sulfonates defined above can be prepared by adding to the double bonds of N,N'-methylene-bisacrylamide or hexahydro-1,3,5-triacryloyl-s-triazine respectively the requisite amount of sodium bisulfite or sodium bisulfite and an amine, for example, diethylamine or guanidine. When an alkyl ether radical is required in the copolymer an alcohol is added to a double bond. When the alkyl sulfonates are used for preparing the copolymer of this invention, it is not necessary to isolate the sulfonate compounds from the aqueous solutions obtained, since the entire solution or part of it may be introduced in the polymerizing system.

THE REACTION MEDIUM AND REACTION CATALYST

The copolymers of this invention are prepared by polymerizing in an aqueous emulsion or suspension system in the presence of an emulgator, such as sodium laurylsulfate, and a peroxide catalyst, e.g. benzoyl peroxide, an azo-catalyst, e.g. azo-bis-isobutyro-nitrile, or a redox catalyst system, e.g. ammoniumpersulfate and sodiumbisulfite, and heating at a temperature between 40 and 60° C. until the conversion has been completed. The polymerization may be either batch-wise or continuous.

OTHER COMONOMERS

The sulfonate-containing copolymers of this invention may also contain at least one other comonomer to promote the dye penetration, for example, methylacrylate, methyl methacrylate, acrylamide, acrylic acid, vinyl acetate, vinyl chloride, vinylidene chloride and styrene. The amount of this other comonomer may be 3–15 percent by weight of the amount of acrylonitrile. It has been found that the presence of these other comonomers in the copolymer has the effect of increasing considerably the dye-receptivity per se of the sulfonate radicals.

CROSS-LINKING

A specific kind of copolymer which is contemplated in connection with the present invention are the slightly cross-linked copolymers which are still soluble in the polymer solvent used for preparing the spinning solution. The amount of cross-linker to secure a completely soluble copolymer is 0.001–0.1 molar percent. This degree of cross-linking corresponds with the formation of one cross-link or branching point per 2–12 linear molecular chains, i.e. the formation of polymeric molecules comprising 4–6 linear chains jointed together radially to the cross-link or branching point. The polymers of this kind may also be defined as multichain molecules.

Examples of cross-linking agents for the purpose described above are, for example, hexahydro-1,3-diacryloyl-5-sulfopropionyl-s-triazine, N,N'-methylene-bis-acrylamide or hexahydro-1,3,5-triacryloyl-s-triazine. Other cross-linking agents may be used. Specific copolymers and fibers prepared from the above possess particularly improved thermal stability at an elevated temperature and an improved dimensional stability.

USE OF NOVEL COPOLYMERS IN SYNTHETIC FIBERS

The new copolymers of this invention can be fabricated into synthetic fibers by conventional wet-or-dry-spinning methods. After stretching the fibers to develop the necessary orientation in the fiber and the incident tensile strength, and thereafter heat-shrinking the fibers to improve their resistance to elevated temperatures, valuable general purpose fibers are obtained.

The slightly cross-linked copolymers previously defined show an improved spinnability in paraffinic or paraffinic-rich hydrocarbons, such as kerosene, due to the effect of the cross-linking. The spinning method using liquid hydrocarbon mixtures as coagulant is disclosed in our copending application Ser. Nos. 662,316 and 662,352. Slightly cross-linked fibers spun in that way show a strongly improved thermal stability, a decreased fat-staining and a strongly increased dyeability for basic dyes compared with fibers containing acrylonitrile and methylacrylate alone. These favorable effects are due to the sulfonate radicals in the copolymer.

An illustrative example of the composition of a copolymer for textile fiber purposes is: 91.0 percent of acrylonitrile, 5.8 percent of methylacrylate and 3.2 percent of hexahydro-1-acryloyl-3,5-disulfopropionyl-s-triazine cross-linked by 0.02 molar percent of hexahydro-1,3,5-triacryloyl-s-triazine. Fiber spun from said copolymer from a 19 percent solution in dimethylformamide into a kerosene coagulant at 135° C. had the following properties:

Thickness, grex (1.11×denier) _____ 4.82
Modulus, g./grex _____ 0.47
Flow limit, g./grex _____ 0.84
Flow limit, elongation percent _____ 1.64
Tensile strength, g./grex _____ 2.70
Elongation at rupture percent _____ 30.47

The dye-reception for Du Pont's Sevron Blue was about 18 percent. A fiber from a corresponding copolymer containing no hexahydro-1-acryloyl-3,5-disulfopropionyl-s-triazine showed a dye-receptance of only 4 percent.

An example of the composition of a copolymer for general technical purposes, such as paper makers' felts, filter cloths and heat insulating purposes is: 96 percent of acrylonitrile and 4 percent of hexahydro-1-acryloyl-3,5-disulfopropionyl-s-triazine cross-linked by 0.02 molar percent of hexahydro-1,3,5-triacryloyl-s-triazine. A fiber prepared in the same manner from said copolymer shows the following properties:

Thickness, grex (1.11×denier) _____ 4.80
Modulus, g./grex _____ 0.53
Flow limit, g./grex _____ 0.85
Flow limit, elongation percent _____ 1.48
Tensile strength, g./grex _____ 3.02
Elongation at rupture percent _____ 27.15

EXAMPLES OF PREPARATION METHODS

The following specific preparation examples are illustrative of preferred processes for carrying out the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

Example 1

20 g. (0.08 mol) of hexahydro-1,3,5-triacryloyl-s-triazine and 500 ml. of water were placed in a 3-necked flask, provided with a thermometer and stirrer. The temperature was raised while stirring to 73° C. When all the triazine was dissolved, 7.5 g. (0.04 mol) of sodium metabisulfite were added. After about 15 minutes the addition was complete. This was controlled by titration with iodine (bisulfite determination) and permanganate (determination of the number of double-bonds per mol). The slightly milky solution was cooled to room temperature and filtered, 7.5 ml. of this solution was diluted with water to 100 ml. In a 2.5 liter autoclave, provided with stirrer and temperature control means, 1500 ml. of water, 1.5 g. of sodium laurylsulfate, 3.0 g. of sodium metabisulfite, and 2.0 g. of ammonium persulfate were charged. The temperature was raised while stirring to about 50° C., and 90 ml. of acrylonitrile were charged. After 3–5 minutes another 20 ml. of acrylonitrile together with 25 ml. of the above mentioned solution of the addition product were introduced. After every 30 minutes, 80 ml. of acrylonitrile and 25 ml. of said solution were added until a total of 350 ml. of acrylonitrile and 100 ml. of said solution had been introduced. 45 minutes after the last charge the temperature was lowered to about 20° C. The polymer was filtered, washed and dried at 90–95° C. for 12 hours. The yield was 90%.

A fiber prepared from a 20% solution of the polymer in dimethylformamide using a paraffinic-rich hydrocarbon as coagulant showed a strongly improved thermal stability, determined by heating samples in air of 160° C. The samples showed only a very slight discoloration after five hours heat treatment.

Example 2

The procedure of Example 1 was repeated with the exception that a mixture of 335 ml. of acrylonitrile and 15 ml. of methylacrylate were used instead of acrylonitrile alone. The yield was 90%.

Fibers made from this polymer showed improved thermal stability, determined as stated in Example 1. Samples showed a slight discoloration after three hours heat treatment. The dye-uptake of Sevron Blue was 7%, and the color yield was improved.

*Example 3*

In a 2.5 liter autoclave, provided with stirrer and means for temperature control, there was introduced 8.0 g. of hexahydro-1,3,5-triacryloyl-s-triazine and 200 ml. of water. The temperature was raised while stirring to about 73° C. When all of the triazine was dissolved, 3.0 g. of sodium metabisulfite were added. The temperature was permitted to drop to about 50° C. When the addition was complete (determined as stated in Example 1), the mixture was diluted with 1500 ml. of water. 1.5 g. of sodium laurylsulfate, 3.0 g. of sodium metabisulfite, and 2.0 g. of ammonium persulfate were then added. The temperature was maintained at 50° C. 350 ml. of acrylonitrile and 0.14 g. of hexahydro-1,3,5-triacryloyl-s-triazine dissolved therein were charged as stated in Example 1, and the polymerization was carried out according to said example. The yield was 88%. The amount of triazine in the copolymer determined by IR-analysis was 84% of the amount charged.

Fibers spun from this copolymer showed a strongly improved thermal stability, determined as stated in Example 1. Samples showed only a slight discoloration after five hours of heat treatment. The fiber also showed an improved dimensional stability. Said property was determined by repeatedly treating for 1 hour in boiling water and then drying for 1 hour at 105° C. without tension and measuring the length of contraction after every treatment. Samples showed that after 5 such treatments here was no measurably further contraction. The fat-staining was decreased and the dye-uptake of Sevron Blue was 8%. The stability to hydrolysis was determined by treating samples in boiling aqueous solutions of different pH (e.g. a buffered aqueous solution of pH 4, 7 and 10 respectively) and measuring the dye-uptake of Sevron Blue. The dye-uptake was not changed after 6 days treatment.

*Example 4*

In a 2.5 liter autoclave, provided with stirrer and temperature control, there was introduced 6.4 g. of hexahydro-1,3,5-triacryloyl-s-triazine and 160 ml. of water. The temperature was raised while stirring to 73° C. When all the triazine was dissolved, 5.0 g. of sodium metabisulfite were added, and the temperature was permitted to drop to 50° C. When the addition was complete the mixture was diluted with 1500 ml. of water, and then 1.5 g. of sodium laurylsulfate, 2.6 g. of sodium metabisulfite, and 2.0 g. of ammonium persulfate were added. The temperature was maintained at 50° C. A mixture of 18.0 ml. of methylacrylate and 332.0 ml. of acrylonitrile and 0.14 g. of hexahydro-1,3,5-triacryloyl-s-triazine dissolved therein were charged as stated in Example 1 and the polymerization was carried out according to said example: the yield was 92%.

Fibers spun from this polymer showed an improved thermal stability, determined as stated in Example 1. Samples showed only a slight discoloration after three hours' heat treatment. The dimensional stability was just as good as that of the fiber of Example 3. The fat-staining was decreased and the dye-uptake of Sevron Blue was 20%.

*Example 5*

In a 2.5 liter autoclave, provided with stirrer and temperature control, there was introduced 125 ml. of the solution of the addition product mentioned in Example 1, and the temperature was raised to 30° C. 2.5 g. of guanidine nitrate were dissolved in 2.5 ml. of water and to this solution 0.8 g. of sodium hydroxide, dissolved in 1 ml. of water, were added. The guanidine solution was put in the autoclave, and the mixture was left overnight. It was neutralized with hydrochloric acid to a pH of 3. The mixture was diluted with 1500 ml. of water, 1.5 g. of sodium laurylsulfate, 6.0 g. of sodium bisulfite and 3.0 g. of ammonium persulfate were then added, and the temperature was raised to 50° C. A mixture of 15.0 ml. of methylacrylate and 335.0 ml. of acrylonitrile and 0.14 g. of hexahydro-1,3,5-triacryloyl-s-triazine dissolved therein were charged as stated in Example 1 and the polymerization was carried out according to said example. The yield was 80%.

Fibers spun from this polymer showed a dye-uptake of Sevron Blue of 18%.

*Example 6*

In a 2.5 liter autoclave, provided with stirrer and temperature control, there was introduced 12.4 g. of N,N'-methylene-bis-acrylamide and 100 ml. of water. The temperature was raised while stirring to about 70° C. When all the N,N'-methylene-bis-acrylamide was dissolved, 7.9 g. of sodium metabisulfite were added and the temperature was permitted to drop to 50° C. When the addition was complete the mixture was diluted with 1500 ml. of water, and 1.5 g. of sodium laurylsulfate, 2.0 g. of sodium metabisulfite, and 2.0 g. of ammonium persulfate were added. The temperature was kept at 50° C. A mixture of 15.0 ml. of methylacrylate and 335.0 ml. of acrylonitrile and 0.14 g. of hexahydro-1,3,5-triacryloyl-s-triazine dissolved therein were charged as stated in Example 1 and the polymerization was carried out according to said example. The yield was 93%.

Fibers spun from this polymer showed an improved thermal stability, determined as stated in Example 1. Samples showed only a slight discoloration after three hours' heat treatment. The fat-staining was decreased and the dye-uptake of Sevron Blue was 13%.

Those skilled in the chemical arts, and particularly in the art to which this invention pertains, will readily appreciate that many modifications of the basic invention set forth here are possible. For example, it is quite possible that other closely related compounds might work as well as the herein specified compounds and there would certainly be no invention involved in trying such closely related compounds, in view of the present broad disclosure.

What is claimed is:

1. A copolymer comprising the product obtained by polymerizing a mixture containing at least 85% by weight of acrylonitrile and an unsaturated sulfonate selected from the group consisting of N-acryloyl-N'-sulfopropionyl-methylenediamine, hexahydro-1,3-diacryloyl-5-sulfopropionyl-s-triazine, hexahydro-1-acryloyl-3,5-disulfopropionyl-s-triazine, and hexahydro-1-acryloyl-3-sulfopropionyl-5-aminopropionyl-s-triazine, wherein the amount of said sulfonate is up to about 15 percent by weight of the mixtures.

2. A copolymer as defined in claim 1, wherein said sulfonate is N-acryloyl-N'-sulfopropionyl-methylenediamine.

3. A copolymer as defined in claim 1, wherein said sulfonate is hexahydro-1,3-diacryloyl-5-sulfopropionyl-s-triazine.

4. A copolymer as defined in claim 1, wherein said sulfonate is hexahydro-1-acryloyl-3,5-disulfopropionyl-s-triazine.

5. A copolymer as defined in claim 1, wherein said sulfonate is hexahydro-1-acryloyl-3-sulfopropionyl-5-aminopropionyl-s-triazine.

6. A copolymer as defined in claim 1, obtained by polymerizing a mixture containing acrylonitrile, said sulfonate and at least one comonomer selected from the group consisting of methylacrylate, methyl methacrylate, acrylamide, acrylic acid, vinyl acetate, vinyl chloride, vinylidene chloride and styrene.

7. A copolymer as defined in claim 1, which is cross-linked to a degree corresponding with the formation of one cross-link per 2–12 linear molecular chains by means of a cross-linking agent to a degree of 0.001–0.1 molar percent.

8. A copolymer as defined in claim 7, wherein the cross-linking agent is a compound selected from the group consisting of N,N'-methylene-bis-acrylamide, hexahydro-1,3,5-triacryloyl-s-triazine and hexahydro-1,3-diacryloyl-5-sulfopropionyl-s-triazine.

9. The copolymer of claim 1 in the form of a shaped article.

10. The article of claim 9 in the form of a filament.

References Cited in the file of this patent

UNITED STATES PATENTS

| | | |
|---|---|---|
| 2,615,887 | Zerner et al. | Oct. 28, 1952 |
| 2,615,888 | Zerner et al. | Oct. 28, 1952 |